US011113975B2

(12) United States Patent
Pastre et al.

(10) Patent No.: US 11,113,975 B2
(45) Date of Patent: Sep. 7, 2021

(54) METHOD AND DEVICE FOR ASSISTING IN THE PILOTING OF AN AIRCRAFT TO OBSERVE A REQUIRED TIME OF ARRIVAL

(71) Applicant: Airbus Operations SAS, Toulouse (FR)

(72) Inventors: Thomas Pastre, Levignac (FR); Jérome Arnoux, Leguevin (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 332 days.

(21) Appl. No.: 16/390,127

(22) Filed: Apr. 22, 2019

(65) Prior Publication Data

US 2019/0333394 A1 Oct. 31, 2019

(30) Foreign Application Priority Data

Apr. 25, 2018 (FR) ...................................... 1853619

(51) Int. Cl.
  *G08G 5/00* (2006.01)
  *G06Q 50/30* (2012.01)
  *G01C 21/10* (2006.01)

(52) U.S. Cl.
  CPC ............. *G08G 5/003* (2013.01); *G06Q 50/30* (2013.01); *G08G 5/0021* (2013.01); *G01C 21/10* (2013.01)

(58) Field of Classification Search
  None
  See application file for complete search history.

(56) References Cited

U.S. PATENT DOCUMENTS

| 5,121,325 A | 6/1992 | DeJonge |
| 9,540,005 B1 | 1/2017 | Howe-Veenstra et al. |
| 2012/0059535 A1 | 3/2012 | Jackson et al. |
| 2016/0069688 A1 | 3/2016 | Polansky et al. |

FOREIGN PATENT DOCUMENTS

| EP | 2426567 A1 | 3/2012 |
| EP | 2993543 A1 | 3/2016 |
| EP | 3232292 A1 | 10/2017 |

OTHER PUBLICATIONS

French Search Report; priority document, dated Dec. 13, 2018.

*Primary Examiner* — Aniss Chad
*Assistant Examiner* — Madison R Hughes
(74) *Attorney, Agent, or Firm* — Greer, Burns & Crain, Ltd.

(57) ABSTRACT

A method for assisting in the piloting of an aircraft to observe a required time of arrival at a waypoint during a flight according to a predetermined flight plan comprising a nominal speed profile, comprising at least two flight segments, comprises the steps of determining an effective speed profile of the aircraft, and controlling by a guidance computer of the aircraft according to the effective speed profile. The step of determining an effective speed profile comprises the substeps of computing, for each segment of the nominal speed profile, a corrective term that is a function of a correction coefficient common to all the segments of the nominal speed profile, and computing, for each segment of the effective speed profile, a setpoint speed equal to the sum of a nominal speed of the nominal speed profile and of the corrective term.

8 Claims, 4 Drawing Sheets

METHOD AND DEVICE FOR ASSISTING IN THE PILOTING OF AN AIRCRAFT TO OBSERVE A REQUIRED TIME OF ARRIVAL

CROSS-REFERENCES TO RELATED APPLICATIONS

This application claims the benefit of the French patent application No. 1853619 filed on Apr. 25, 2018, the entire disclosures of which are incorporated herein by way of reference.

FIELD OF THE INVENTION

The present invention relates to a method and a system for assisting in the piloting of an aircraft, which are intended to assist in the observance of a required time of arrival at a waypoint, during a flight of the aircraft.

BACKGROUND OF THE INVENTION

The piloting of aircraft, in particular civilian or military transport airplanes, is generally performed along a flight plan comprising a set of waypoints defined in three-dimensional space. The aircraft has to be guided along the flight plan by observing a maximum margin of position error relative to segments linking the different waypoints. Increasingly often, in particular in zones with high traffic density, some of the waypoints of the flight plan include a required time of arrival RTA imposed by air traffic control in order to guarantee a satisfactory separation of the different aircraft. In such a case, the aircraft has to be guided along the flight plan by also observing a maximum margin of time error relative to the RTA constraints of the waypoints including such a constraint.

Normally, before the flight, the speed of the aircraft is generally planned in the form of a cost index. This cost index normally corresponds to a coefficient lying between 0 and 100, such that, when this coefficient is equal to 100, the planned speed corresponds to a maximum operational speed Vmax of the aircraft and when this coefficient is equal to 0, the planned speed corresponds to a minimum operational speed Vmin of the aircraft. When the cost index is equal to a value k lying between 0 and 100, the planned speed is equal to:

$$Vmin+k(Vmax-Vmin)/100.$$

Before the flight, the cost index is entered by the pilot of the aircraft into a flight management computer of the aircraft, for example a computer of FMS (Flight Management System) type. During the flight, the flight management computer controls a guidance computer of the aircraft according to the flight plan and the cost index. If the pilot receives from air traffic control a constraint of RTA type at a waypoint of the flight plan, he or she enters this constraint into the flight management computer. The flight management computer then computes an estimated time of arrival of the aircraft at this waypoint by taking into account the current value of the cost index. This estimated time of arrival is generally referred to as ETA. The document U.S. Pat. No. 5,121,325 describes a system that makes it possible to determine an estimated time of arrival of an aircraft at a particular point. The flight management computer compares this estimated time of arrival ETA with the RTA constraint. If the difference between the ETA and RTA times is above a predetermined time threshold (for example 10 seconds), the flight management computer computes a new value of the cost index that makes it possible to reduce the difference to a value below this predetermined time threshold, then it controls the guidance computer as a function of said new value of the cost index.

For some flights of an aircraft, a nominal speed profile comprising several flight segments is defined before the flight of the aircraft. A nominal flight speed of the aircraft is defined for each flight segment. A minimum flight speed and a maximum flight speed of the aircraft are also defined for each flight segment of the aircraft. Such a speed profile makes it possible to define different flight strategies for the different flight segments. An example of flight plan comprising such a nominal speed profile 20 is illustrated in FIG. 2. This nominal speed profile comprises five segments S1 to S5 for which the planned altitude 30 of the aircraft is illustrated by the figure. The segment S1, entitled "LONG RANGE" is a cruising flight segment at constant altitude. The nominal speed defined for this segment is 250 kts (knots), i.e., approximately 463 km/h. This speed is close to the center of the range of admissible speeds lying between Vmin=180 kts (approximately 333 km/h) and Vmax=300 kts (approximately 555 km/h), which makes it possible to optimize the fuel consumption. The segment S2, entitled "MAX ENDUR" is a climbing flight segment. The nominal speed defined for this segment is 190 kts (knots), i.e., approximately 352 km/h. This speed is situated more in the lower part of the range of admissible speeds lying between Vmin=180 kts (approximately 333 km/h) and Vmax=300 kts (approximately 555 km/h) so as to allow the aircraft to stay in flight for as long as possible and to guarantee a suitable rate of climb. The segment S3, entitled "LONG RANGE" is another cruising flight segment at constant altitude. The nominal speed defined for this segment is 235 kts (knots), i.e., approximately 435 km/h. This speed is close to the center of the range of admissible speeds lying between Vmin=195 kts (approximately 361 km/h) and Vmax=290 kts (approximately 537 km/h), which makes it possible to optimize the fuel consumption. The segment S4, entitled "MAX SPD" is a descending flight segment. The nominal speed defined for this segment is 290 kts (knots), i.e., approximately 546 km/h. This speed corresponds to the upper limit of the range of admissible speeds lying between Vmin=195 kts (approximately 361 km/h) and Vmax=290 kts (approximately 546 km/h) so as to guarantee a suitable rate of descent. The segment S5, entitled "LONG RANGE" is also a cruising flight segment at constant altitude. The nominal speed defined for this segment is 265 kts (knots), i.e., approximately 490 km/h. This speed is close to the center of the range of admissible speeds lying between Vmin=195 kts (approximately 361 km/h) and Vmax=295 kts (approximately 546 km/h), which makes it possible to optimize the fuel consumption.

When the flight management computer controls the guidance of the aircraft as a function of a flight plan comprising such a nominal speed profile, if the pilot of the aircraft receives an RTA constraint originating from air traffic controller and enters this RTA constraint into the flight management computer, then the flight management computer modifies the speed profile as indicated previously, that is to say, by computing a cost index for all of the flight plan. That has the effect of smoothing the speed variations between the different segments of the flight plan and, consequently, the flight plan modified to take account of the RTA constraint no longer takes account of the chosen strategy in terms of speed profile. Thus, in a particular example, for the speed profile illustrated by FIG. 2 and for an instant t0 corresponding to the start of the segment S1 equal to 12h00, by considering that the different segments S1 to S5 all have a length of 100 Nm (approximately 185.2 km), the instant t5 corresponding to the arrival of the aircraft at the end of the segment S5 is for example equal to 14h04. Assuming that the pilot receives and enters into the flight management computer an RTA constraint equal to 14h00 for the waypoint at the end of the segment S5, the flight management computer computes a cost index that makes it possible to arrive at this waypoint at the instant t5 equal to 14h00. The duly modified flight plan is illustrated in FIG. 3. In this particular example, the cost index computed by the flight management computer would be 58. The result thereof is that the speeds computed Vcalc by the flight computer to observe the RTA constraint would be equal to Vcalc=Vmin+0.58 (Vmax−Vmin) on each segment. Once the cost index has been computed, these computed speed values depend only on the limit values Vmax and Vmin for each segment. They would be equal to:

for the segment S1: Vcalc=249.6 kts
for the segment S2: Vcalc=249.6 kts
for the segment S3: Vcalc=250.1 kts
for the segment S4: Vcalc=250.1 kts
for the segment S5: Vcalc=248.6 kts The differences between the computed speeds corresponding to the different segments are very greatly reduced relative to the differences between the nominal speeds corresponding to these different segments. Consequently, the speed profile of the flight plan modified to observe the RTA constraint is completely different from the nominal speed profile. Now, it would be desirable for the speed profile of the modified flight plan to observe the different flight strategies defined for the different segments of the flight plan.

SUMMARY OF THE INVENTION

An object of the present invention is to remedy the abovementioned drawbacks. It relates to a method for assisting in the piloting of an aircraft, which is intended to assist in the piloting of the aircraft in order to observe a required time of arrival at a waypoint during a flight of the aircraft according to a predetermined flight plan, this flight plan comprising a nominal speed profile of the aircraft comprising at least two distinct flight segments for each of which there are defined a nominal flight speed, a maximum flight speed and a minimum flight speed of the aircraft.

This method is noteworthy in that it comprises the following steps implemented by a processing unit of a flight management computer of the aircraft:

a) determination of an effective speed profile of the aircraft, this effective speed profile comprising flight segments similar to those of the nominal speed profile, said determination comprising the following substeps:

a3) computation, for each segment of the nominal speed profile, of a corrective term corresponding to the product of a correction coefficient by a difference between, on the one hand, one of the maximum speed or the minimum speed defined for this segment and, on the other hand, the nominal speed corresponding to this segment, the correction coefficient being a correction coefficient common to all the segments of the nominal speed profile; and a4) computation, for each segment of the effective speed profile, of a setpoint speed equal to the sum of the nominal speed defined for the corresponding segment of the nominal speed profile and of the corrective term computed for the corresponding segment of the nominal speed profile, b) controlling of a guidance computer of the aircraft to guide the aircraft according to the effective speed profile determined in the step a).

Thus, the effective speed profile that makes it possible to observe the required time of arrival at the waypoint is such that the setpoint speed computed for each flight segment corresponds to the nominal flight speed for the corresponding flight segment of the nominal speed profile, corrected by a corrective term. This corrective term corresponds to the product of the correction coefficient common to all the segments by the difference between a speed limit (maximum or minimum) corresponding to this segment and the nominal speed corresponding to this segment. This difference corresponds to a margin between the nominal speed and the speed limit Consequently, the speeds of the different segments of the effective speed profile are based on the nominal speeds of the corresponding segments of the nominal speed profile and the corrective terms corresponding to the different segments make it possible to uniformly correct the speeds of the different segments in order for the proportions between the speed margins corresponding to the different segments of the effective flight plan to be similar to the proportions between the speed margins corresponding to the different segments of the nominal flight plan. That makes it possible to obtain an effective speed profile that is consistent with the nominal speed profile from the point of view of the respective speeds corresponding to the different flight segments.

In one embodiment, the step a) comprises a substep a1) of computation of an estimated time of arrival at the waypoint by considering that the aircraft flies according to the nominal speed profile and, in the step a3), the difference between, on the one hand, one of the maximum speed or the minimum speed defined for the segment and, on the other hand, the nominal speed corresponding to this segment is chosen to be equal to:

the difference between the maximum speed and the nominal speed defined for this segment when said estimated time of arrival at the waypoint is later than the required time of arrival; and the difference between the minimum speed and the nominal speed defined for this segment when said estimated time of arrival at the waypoint is prior to the required time of arrival.

Advantageously, the step a) further comprises:

a substep a2), prior to the substep a3), of selection of a value of the correction coefficient common to all the segments of the speed profile; and a substep a5) of computation of an estimated time of arrival at the waypoint by considering that the aircraft flies according to the effective speed profile comprising the setpoint speed values computed in the substep a4), and the substeps a2), a3), a4) and a5) are implemented iteratively until the difference between the estimated time of arrival at the waypoint and the required time of arrival is below a predetermined time threshold.

Also advantageously, in the substep a2), the value of the correction coefficient common to all the segments of the speed profile is selected by using a dichotomy method.

In particular, the dichotomy method is a dichotomy method weighted as a function of the difference between the estimated time of arrival at the waypoint and the required time of arrival.

Preferably, the value of the correction coefficient lies between 0 and 1.

The invention also relates to a system for assisting in the piloting of an aircraft in order to observe a required time of arrival at a waypoint during a flight of the aircraft according to a predetermined flight plan, this flight plan comprising a nominal speed profile of the aircraft comprising at least two distinct flight segments, for each of which there are defined a nominal flight speed, a maximum flight speed and a minimum flight speed of the aircraft. This system is noteworthy in that it comprises:

a flight management computer which comprises a processing unit configured to determine an effective speed profile of the aircraft, this effective speed profile comprising flight segments similar to those of the nominal speed profile, said determination of the effective speed profile comprising:

the computation, for each segment of the nominal speed profile, of a corrective term corresponding to the product of a correction coefficient by a difference between, on the one hand, one of the maximum speed or the minimum speed defined for this segment and, on the other hand, the nominal speed corresponding to this segment, the correction coefficient being a correction coefficient common to all the segments of the nominal speed profile; and the computation, for each segment of the effective speed profile, of a setpoint speed equal to the sum of the nominal speed defined for the corresponding segment of the nominal speed profile and of the corrective term computed for the corresponding segment of the nominal speed profile, a guidance computer of the aircraft configured to guide the aircraft according to the effective speed profile determined by the processing unit of the flight management computer.

The invention relates also to an aircraft comprising such a piloting assistance system.

BRIEF DESCRIPTION OF THE DRAWINGS

The invention will be better understood on reading the following description and on studying the attached figures.

DETAILED DESCRIPTION OF THE PREFERRED EMBODIMENTS

Figure 1:
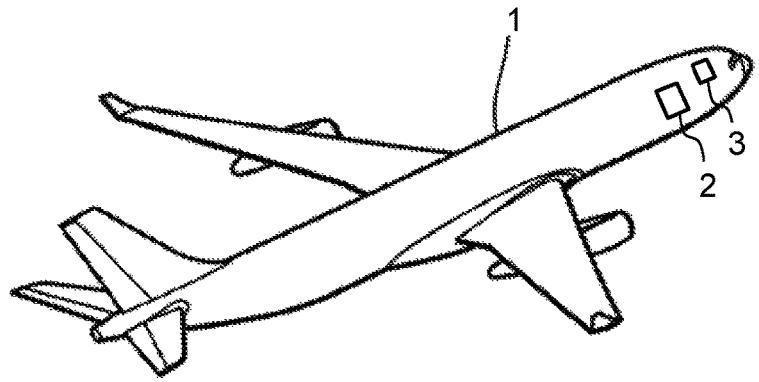
FIG. 1 represents an aircraft comprising a piloting assistance system according to the invention.
Figure 5:
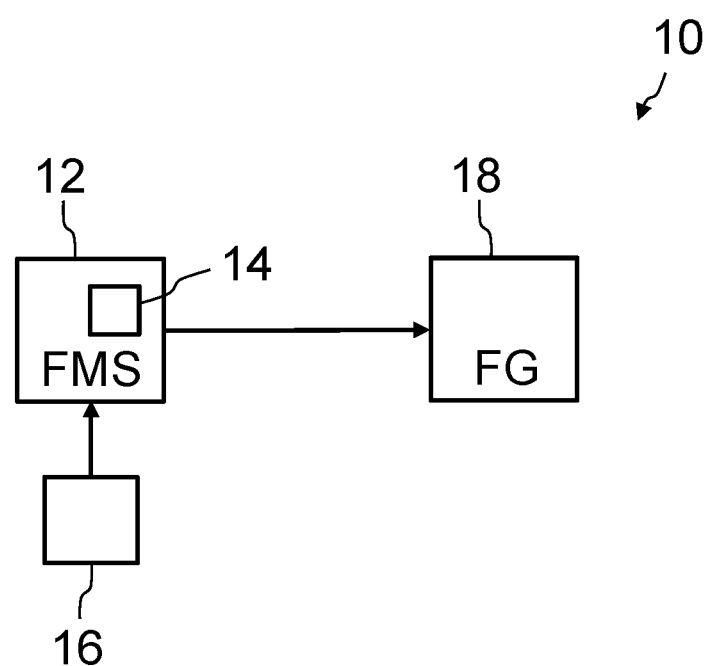
FIG. 5 is a block diagram of a piloting assistance system of an aircraft, according to the invention.

The system 10 represented schematically in FIG. 5 is in accordance with an embodiment of the invention. It is embedded on board an aircraft 1 as represented in FIG. 1, in particular a civilian transport airplane or a military transport airplane, in order to assist this aircraft in flying according to a flight plan, by observing a required time of arrival RTA at a waypoint of the flight plan. This system is, for example, installed in an avionics bay 2 of the aircraft. The system 10 comprises a flight management computer 12 of the aircraft, in particular a computer of FMS (Flight Management System) type. This flight management system computer comprises a processing unit 14. It also comprises a memory that is not represented, provided to store at least one flight plan of the aircraft. The flight management computer 12 is linked at the input to a human-machine interface 16, preferably situated in the cockpit 3 of the aircraft. This human-machine interface corresponds, in particular, to an assembly comprising a screen, a keyboard and/or a pointing unit, for example a unit of MCDU (Multipurpose Control and Display Unit) type. An output of the flight management computer 12 is linked to an input of a guidance computer 18 of the aircraft, in particular a computer of FG (Flight Guidance) type. This guidance computer is, for example, provided to guide the aircraft according to an automatic guidance mode (when an automatic pilot of the aircraft is engaged) or according to a manual guidance mode, for example by means of a flight director.

In operation, before a flight of the aircraft, a pilot of the aircraft defines a nominal flight plan for this flight of the aircraft and he or she enters this flight plan into the flight management computer 12 by means of the human-machine interface 16. When appropriate for this planned flight of the aircraft, this nominal flight plan comprises a nominal speed profile of the aircraft comprising at least two distinct flight segments for each of which there are defined a nominal flight speed, a maximum flight speed and a minimum flight speed of the aircraft. The flight management computer saves the nominal flight plan and the nominal speed profile in its memory. Such a nominal speed profile, for example the nominal speed profile 20 illustrated in FIG. 2 that has already been described, makes it possible to define different flight strategies for the different flight segments.

During the flight of the aircraft, the flight management computer controls the guidance computer 18 of the aircraft to guide the aircraft according to the nominal flight plan and the nominal speed profile. Sometimes, air traffic control may be required to send, to the pilot of the aircraft, a required time of arrival RTA associated with a waypoint of the flight plan. If the pilot approves this constraint, he or she enters it into the flight management computer by means of the human-machine interface 16. The flight management computer 12 then determines an effective speed profile 21 of the aircraft that makes it possible to observe the RTA constraint, then it controls the guidance computer 18 of the aircraft to guide the aircraft according to the duly determined effective speed profile. This effective speed profile comprises flight segments similar to those of the nominal speed profile. Its determination by the flight management computer 12 comprises the following steps:

a3) computation, for each segment of the nominal speed profile, of a corrective term corresponding to the product of a correction coefficient by a difference between, on the one hand, one of the maximum speed or the minimum speed defined for this segment and, on the other hand, the nominal speed corresponding to this segment, the correction coefficient being a correction coefficient common to all the segments of the nominal speed profile; and a4) computation, for each segment of the effective speed profile, of a setpoint speed equal to the sum of the nominal speed defined for the corresponding segment of the nominal speed profile and of the corrective term computed for the corresponding segment of the nominal speed profile.

In particular, in a step a1) prior to the step a3), the flight management computer 12 computes an estimated time of arrival ETA at the waypoint by considering that the aircraft flies according to the nominal speed profile. Then, in the step a3), the difference between, on the one hand, one of the maximum speed or the minimum speed defined for the segment and, on the other hand, the nominal speed corresponding to this segment is chosen to be equal to:

the difference between the maximum speed and the nominal speed defined for this segment when said estimated time of arrival at the waypoint is later than the required time of arrival RTA; and the difference between the minimum speed and the nominal speed defined for this segment when said estimated time of arrival at the waypoint is prior to the required time of arrival RTA.

Figure 2:
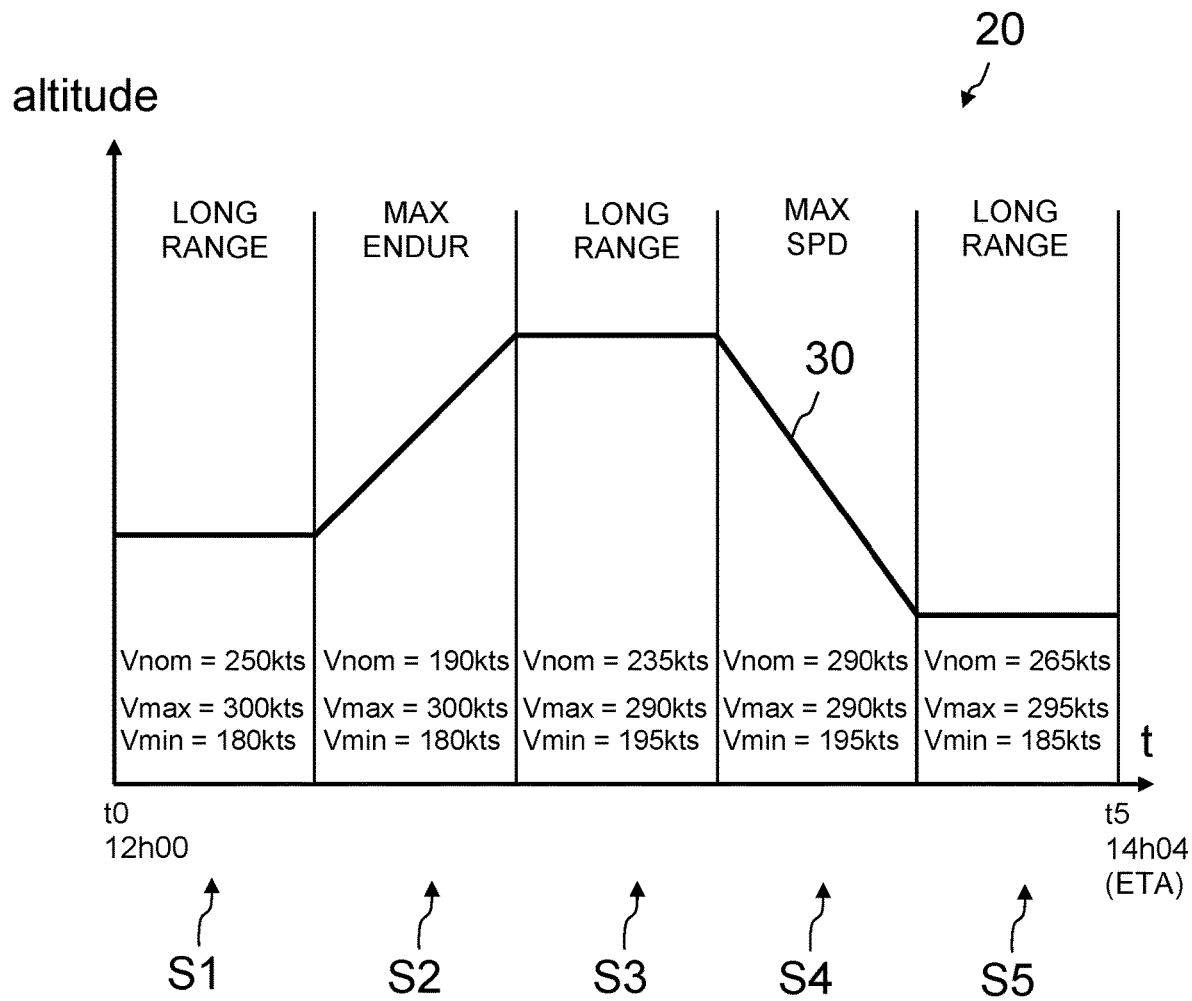
FIG. 2, already described, illustrates a nominal speed profile of a flight plan of the aircraft.
Figure 3:
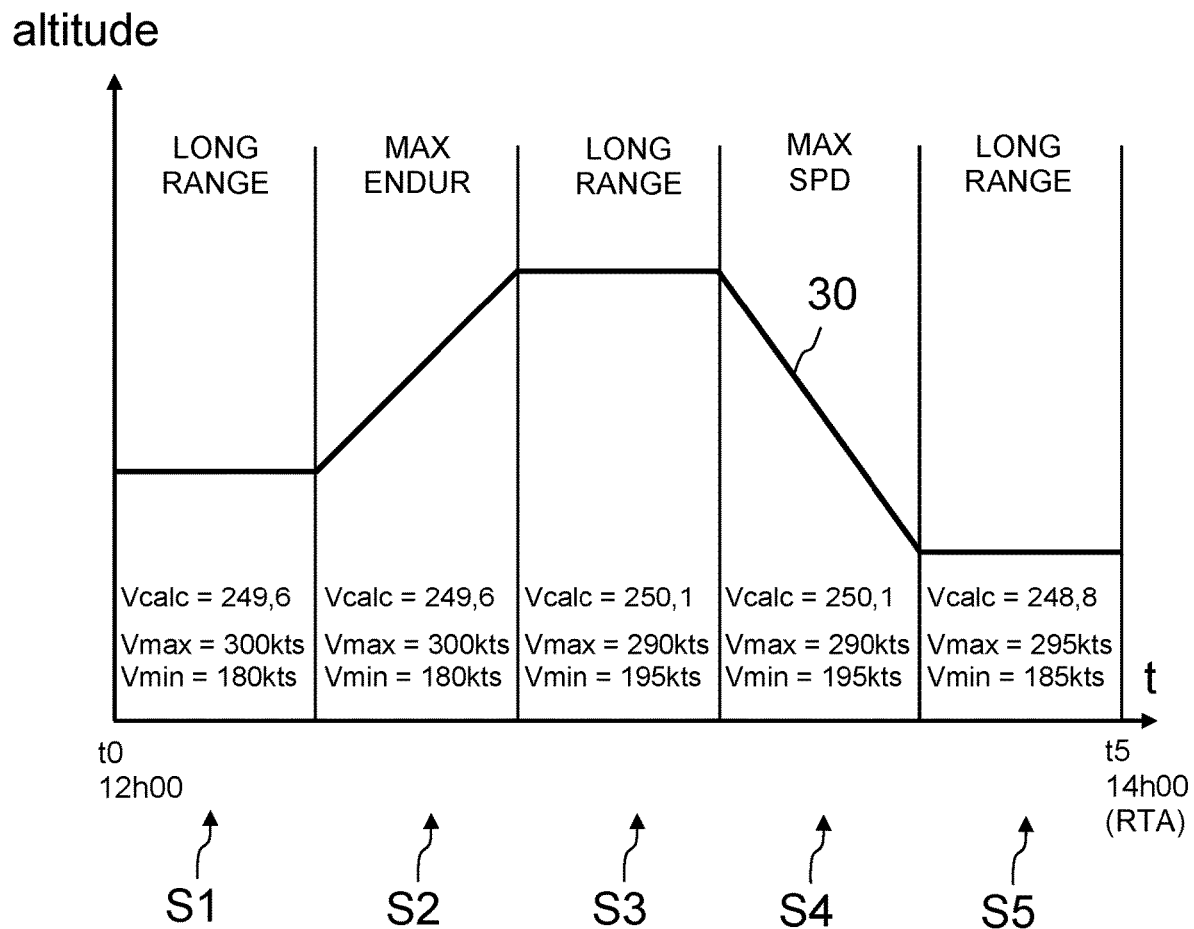
FIG. 3, already described, illustrates a speed profile according to the prior art, that makes it possible to observe an RTA constraint.

In the example illustrated in FIG. 2, assuming that the pilot receives and enters into the flight management computer an RTA constraint equal to 14h00 for the waypoint at the end of the segment S5, the flight management computer computes the estimated time of arrival ETA at this waypoint. This estimated time of arrival corresponds to the instant t5 illustrated in the figure. As was indicated earlier, this instant t5 corresponding to the arrival of the aircraft at the end of the segment S5 is equal to 14h04. Consequently, the estimated time of arrival ETA is later than the required time of arrival RTA. The result thereof is that, in the step a3), for each segment of the speed profile, the corrective term corresponds to the product of the correction coefficient by a difference between the maximum speed defined for this segment and the nominal speed corresponding to this segment.

Advantageously, in a step a2) following the step a1) and prior to the step a3), the flight management computer selects a value of the correction coefficient common to all the segments of the speed profile and, in a step a5) following the step a4), it computes an estimated time of arrival ETA at the waypoint by considering that the aircraft flies according to the effective speed profile comprising the setpoint speed values computed in the step a4). The flight management computer repeats the steps a2), a3), a4) and a5), by choosing, each time, a new value of the correction coefficient in the step a2), until the difference between the estimated time of arrival ETA at the waypoint and the required time of arrival RTA is below a predetermined time threshold. This time threshold is chosen such that said difference between the estimated time of arrival ETA at the waypoint and the required time of arrival RTA is sufficiently low for the RTA constraint to be considered as satisfactory. This threshold can for example be chosen to be equal to 10 seconds.

In a particular embodiment, in the step a2), the value of the correction coefficient common to all the segments of the speed profile is selected by using a dichotomy method. Advantageously, the dichotomy method is weighted as a function of the difference between the estimated time of arrival ETA at the waypoint and the required time of arrival RTA, which makes it possible to reduce the number of iterations of the steps a2) to a5) necessary to determine the correction coefficient.

Figure 4:
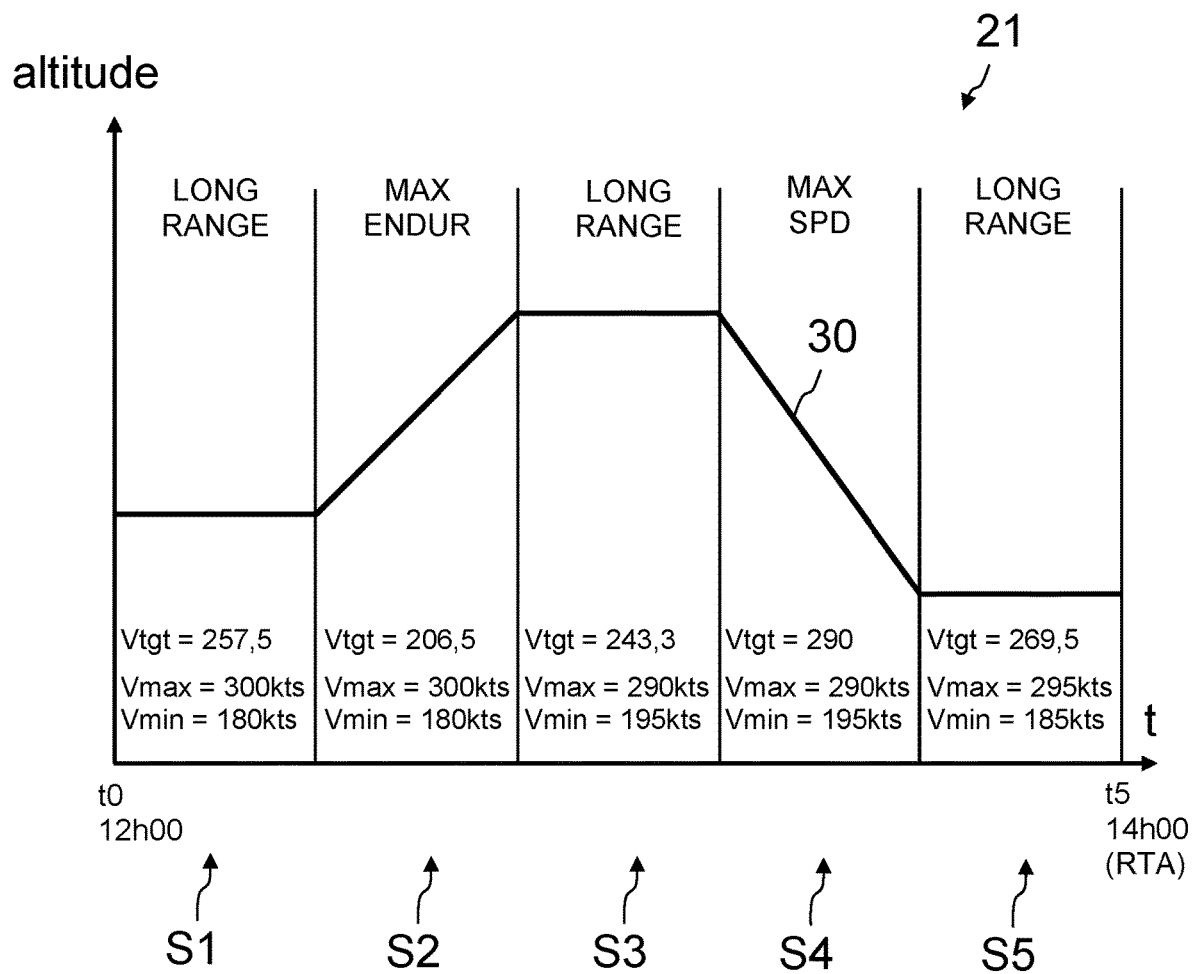
FIG. 4 illustrates a speed profile determined by a piloting assistance system of an aircraft, according to the invention.

In the particular case of the example considered previously, as indicated previously, for each segment of the speed profile, the corrective term corresponds to the product of the correction coefficient by a difference between the maximum speed defined for this segment and the nominal speed corresponding to this segment. Given the maximum speed and nominal speed values for the different segments, the flight management computer determines a value of the correction coefficient equal to 0.15. Consequently, for each segment of the speed profile, the setpoint speed Vtgt computed by the flight management computer is equal to $V_{tgt}=V_{nom}+0.15(V_{max}-V_{nom})$. As illustrated by FIG. 4, the setpoint speeds of the effective speed profile 21 for the segments S1 to S5 are therefore equal to:
 for the segment S1: Vtgt=257.5 kts
 for the segment S2: Vtgt=206.5 kts
 for the segment S3: Vtgt=243.3 kts
 for the segment S4: Vtgt=290.0 kts
 for the segment S5: Vtgt=269.5 kts Thus, the relative values of the speeds corresponding to the different segments S1 to S5 are substantially retained relative to the nominal speed profile.

Given the formula used to compute the setpoint speeds, the value of the correction coefficient lies between 0 and 1.

According to a first alternative, the nominal speed profile whose nominal, maximum and minimum speed values are used for the computation of the setpoint speeds of the effective speed profile, corresponds to the nominal speed profile of the optimal flight plan defined before the flight of the aircraft. The flight management computer then stores, on the one hand, the optimal flight plan and its optimal speed profile and, on the other hand, an effective flight plan and its effective speed profile. Before the start of the flight, the flight management computer 12 copies the optimal flight plan and its optimal speed profile to the effective flight plan and its effective speed profile and it controls the guidance computer 18 according to the effective flight plan and the effective speed profile. If, during the flight of the aircraft, an RTA constraint is entered by the pilot into the flight management computer, the flight management computer computes the setpoint speed values of the effective speed profile as indicated previously (in the step a4) and the effective speed profile used for the guidance of the aircraft is thus modified to take account of the RTA constraint. If a new RTA constraint is entered into the flight management computer during the same flight of the aircraft, new setpoint speed values of the effective speed profile are computed as a function of the nominal, maximum and minimum speeds of the nominal speed profile defined before the flight and saved in the memory of the flight management computer.

According to a second alternative, the nominal speed profile whose nominal, maximum and minimum speed values are used for the computation of the setpoint speeds of the effective speed profile, corresponds to a speed profile of a current flight plan of the aircraft. The flight management computer then stores a single flight plan and its speed profile. Before the start of the flight, when the optimal flight plan and its optimal speed profile are entered by the pilot into the flight management computer 12, this optimal flight plan and its optimal speed profile are stored directly in the memory corresponding to the current flight plan and to its speed profile. The flight management computer 12 controls the guidance computer 18 according to the current flight plan and its effective speed profile. If, during the flight of the aircraft, a first RTA constraint is entered by the pilot into the flight management computer, the flight management computer computes the setpoint speed values of the effective speed profile as indicated previously in the step a4) by considering the optimal flight plan and its optimal speed profile as corresponding to the current flight plan and to its speed profile. This speed profile of the current flight plan then corresponds to the nominal speed profile stored before the start of the flight. The effective speed profile determined by the flight management computer is copied into the speed profile of the current flight plan so as to allow the aircraft to be guided according to this effective speed profile. If a new RTA constraint is entered into the flight management computer during the same flight of the aircraft, new setpoint speed values of the effective speed profile are computed by again considering the optimal flight plan and its optimal speed profile as corresponding to the current flight plan and to its speed profile. This speed profile then corresponds to the effective speed profile computed following the reception of the preceding RTA constraint. That is acceptable, given that the relative values of the setpoint speeds corresponding to the different flight segments are substantially retained in the computation of the effective speed profile from the nominal speed profile.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting in the piloting of an aircraft in order to observe a required time of arrival at a waypoint during a flight of the aircraft according to a predetermined flight plan, this flight plan comprising a nominal speed profile of the aircraft comprising at least two distinct flight segments for each of which there are defined a nominal flight speed, a maximum flight speed and a minimum flight speed of the aircraft, the method comprising the following steps implemented by a processing unit of a flight management computer of the aircraft:
   a) determination of an effective speed profile of the aircraft, this effective speed profile comprising flight segments similar to those of the nominal speed profile, said determination comprising the following substeps:
      a3) computation, for each segment of the nominal speed profile, of a corrective term corresponding to a product of a correction coefficient by a difference between one of the maximum speed or the minimum speed defined for this segment and the nominal speed corresponding to this segment, the correction coefficient being a correction coefficient common to all the segments of the nominal speed profile; and
      a4) computation, for each segment of the effective speed profile, of a setpoint speed equal to a sum of the nominal speed defined for a corresponding segment of the nominal speed profile and of the corrective term computed for the corresponding segment of the nominal speed profile,
   b) controlling of a guidance computer of the aircraft to guide the aircraft according to the effective speed profile determined in the step a).

2. The method according to claim 1, wherein step a) comprises a substep a1) of computation of an estimated time of arrival at the waypoint by considering that the aircraft flies according to the nominal speed profile and, in step a3), the difference between one of the maximum speed or the minimum speed defined for the segment and the nominal speed corresponding to this segment is chosen to be equal to:
   the difference between the maximum speed and the nominal speed defined for this segment when said estimated time of arrival at the waypoint is later than the required time of arrival; and
   the difference between the minimum speed and the nominal speed defined for this segment when said estimated time of arrival at the waypoint is prior to the required time of arrival.

3. The method according to claim 2, wherein step a) further comprises:
   a substep a2), prior to substep a3), of selection of a value of a correction coefficient common to all the segments of the speed profile; and
   a substep a5) of computation of an estimated time of arrival at the waypoint by considering that the aircraft flies according to the effective speed profile comprising the setpoint speed values computed in substep a4), and
   substeps a2), a3), a4) and a5) are implemented iteratively until the difference between the estimated time of arrival at the waypoint and the required time of arrival is below a predetermined time threshold.

4. The method according to claim 3, wherein, in substep a2), a value of the correction coefficient common to all the segments of the speed profile is selected by using a dichotomy method.

5. The method according to claim 4, wherein the dichotomy method is a dichotomy method weighted according to the difference between the estimated time of arrival at the waypoint and the required time of arrival.

6. The method according to claim 1, wherein a value of the correction coefficient lies between 0 and 1.

7. A system for assisting in a piloting of an aircraft in order to observe a required time of arrival at a waypoint during a flight of the aircraft according to a predetermined flight plan, this flight plan comprising a nominal speed profile of the aircraft comprising at least two distinct flight segments for each of which there are defined a nominal flight speed, a maximum flight speed and a minimum flight speed of the aircraft, the system comprising:
   a flight management computer which comprises a processing unit configured to determine an effective speed profile of the aircraft, this effective speed profile comprising flight segments similar to those of the nominal speed profile, said determination of the effective speed profile comprising:
      a computation, for each segment of the nominal speed profile, of a corrective term corresponding to a product of a correction coefficient by a difference between one of the maximum flight speed or the minimum flight speed defined for this segment and the nominal flight speed corresponding to this segment, the correction coefficient being a correction coefficient common to all segments of the nominal speed profile; and
      a computation, for each segment of the effective speed profile, of a setpoint speed equal to a sum of the nominal flight speed defined for the corresponding segment of the nominal speed profile and of the corrective term computed for a corresponding segment of the nominal speed profile,
   a guidance computer of the aircraft configured to guide the aircraft according to the effective speed profile determined by the processing unit of the flight management computer.

8. An aircraft comprising a piloting assistance system according to claim 7.

* * * * *